United States Patent

[11] 3,630,272

| [72] | Inventor | Donald A. Kelly<br>58-06 69th Pl., Maspeth, New York, N.Y. 11378 |
|---|---|---|
| [21] | Appl. No. | 6,116 |
| [22] | Filed | Jan. 27, 1970 |
| [45] | Patented | Dec. 28, 1971 |

[54] COMPOUND THERMAL SYSTEM FOR CLOSED CYCLE ENGINES
10 Claims, 6 Drawing Figs.

[52] U.S. Cl. .................................................... 165/44, 60/24
[51] Int. Cl. .......................................... B60h 3/00
[50] Field of Search ............................................ 165/23, 41–44; 62/5; 60/24

[56] References Cited
UNITED STATES PATENTS

| 2,786,341 | 3/1957 | Green ........................... | 62/5 |
| 3,477,226 | 11/1969 | Percival ........................ | 60/24 |
| 3,509,719 | 5/1970 | Kelly ............................. | 60/24 |

*Primary Examiner*—Frederick L. Matteson
*Assistant Examiner*—Harry B. Ramey

ABSTRACT: The compound thermal system for C. C. E.'s is intended to provide a versatile and reliable heating and cooling method for closed cycle engines, by adopting two separate thermal arrangements which are coordinated for optimum thermal exchange at minimum air pollution levels.

The basic heating means consists of a conventional gas or oil burner unit set to burn at a constant rate for minimizing toxic emissions.

The basic cooling means consists of a specially formed liquid coolant jacket in direct contact with the cold surfaces of the engine.

The second thermal means consists of airflow temperature splitters—or vortex tubes arranged in series array with the hot and cold airflows directed over the hot and cold engine areas respectively.

The hot airflow from the seried vortex tubes is used primarily to raise the combustion temperature of the conventional fuel burner unit in support of the complete combustion process.

INVENTOR.
Donald A. Kelly

INVENTOR.
Donald A. Kelly

COMPOUND THERMAL SYSTEM FOR CLOSED CYCLE ENGINES

The compound heating and cooling system for closed cycle engines has been evolved as part of a persistent effort to develop a near-zero air pollution power source for motor vehicles, and to generally improve the future application of closed cycle engine technology.

A unique and unorthodox heating and cooling method for closed cycle engines is necessary, since conventional heating sources and engines do not fully meet the stringent requirements for effective air pollution control.

The compound thermal system essentially consists of utilizing and coordinating separate conventional and unconventional thermal means to provide both a constant heating rate and applying a variable heating means for engine power control.

The conventional oil or gas fuel burner or burners provide the constant or steady heating means, so that the exhaust emissions can be set to a normal minimum level.

The airflow speed through the series vortex tubes would be readily variable to provide the necessary delta temperature change which would be synchronized with the engine working gas pressure changing means to provide an effective and wide range of engine speed/torque control.

Various types of unusual heating means have been proposed in the past for closed cycle engines, and particularly for the Stirling cycle engine, such as catalytic heating, photo-heating means, frictional heating and other means. Most of these heating sources are either ineffective, inefficient or too costly to be competitive with conventional heating means.

A system of combining heating sources appears particularly attractive, if advantage is taken of the basic efficiency of conventional oil or gas burners set to burn at a constant and minimum emission rate, and some other effective, low-cost heating means whose thermal output can be varied rapidly without increasing the toxic emission level of the combined thermal system.

The airflow temperature splitters—or vortex tubes in series array—is advocated as the second thermal means since they are compatible with reasonable costs, near-zero toxic emission requirements, while providing a delta temperature range rather than heating alone.

The feature of proportional heating and cooling of a given airflow through multiple series vortex tubes is a most desirable advantage for the thermal requirements of Stirling, Brayton, and Rankine cycle engines, since they all require a large delta temperature, rather than high heating alone for effective operation. By arranging the temperature separators or vortex tubes in series proportionally greater delta temperature steps, for the power expended, are established until the required final temperatures are provided for the engine operation to meet the power needed for the given application.

Since the air driven through the multiple vortex tubes may be impelled by electric motor driven blowers or fans, their speed is readily controlled by rheostat, so that the delta temperature may be changed rapidly.

The electric motor which drives the compressor for the internal pressurizing of the engine may be connected with the vortex tube blower motors, so that the working gas pressure and delta temperature are varied together for effective power output control. The electric motors receive their electrical energy from a storage battery array.

Because a reliable and effective primary heating and cooling means are employed it is also feasible that both the internal gas compressor and the vortex tube blowers be driven by the engine as accessories. The torque required to drive both the air blowers and compressor is relatively small so that a significant net power output gain should be realized with such an arrangement. The gas compressor for the internal pressurizing of the engine runs only intermittently for short duration, so that its power drain on the system is intermittent and minimal.

Since the multiple air blowers for the air splitters or vortex tubes may be at odd angles to the engine it would appear that flexible cable drives would be most suitable to drive the blowers, so that complex gears and rigid shafting is avoided. It is likely that engine mounted gear box drives will be required to increase the speed to the air blowers to achieve proper air thermal separation within the air splitters or vortex tubes.

In this arrangement airflow speed through the air splitters or vortex tubes is proportional to engine output speed, with the engine speed controlled by the internal gas pressure level, through operation of the gas compressor.

It may be necessary to vary the speed to the air splitters or vortex tubes blowers independent of engine speed to provide an effective speed control range, as in the electric motor and battery system. An independent arrangement would require a single engine mounted variable drive unit, with multiple output cable drives to the individual air blowers. The speed of the vari-drive unit would be varied with the internal gas pressure controlled by the gas compressor, as in the electric motor and battery system.

The basic cooling means will consist of a conventional, but high-speed liquid coolant circulating system especially configured with a coolant jacket which provides for the large surface heat transfer area required for the freezing airflow from the air splitters or vortex tubes. The cooling system for the closed cycle engine should be extremely effective because of the compounding effect of the freezing airflow over the high-speed circulating liquid coolant.

It is expected that the cooling effectiveness will be considerably greater than the heating effectiveness, since the hot airflow cannot be made hot enough to match the high-temperature levels provided by conventional fuel burners. The best application for the hot airflow appears to be in raising the combustion temperature of conventional fuel burners, while aiding in the complete combustion process in support of minimum level toxic emissions.

By arranging the two groups of air temperature splitters or vortex tubes in a series of stages, precooling and preheating means can be added, along with interstate coolers and heaters between the stages.

Each series of air splitters or VT's provides a bias air temperature flow of "hot" and "cold" air splitters or VT's with thermal cross connections provided for scavenging the ejected and opposite air temperature flow from each air splitter group.

The combining of pre- and interstage heaters and coolers plus thermal cross connections provides greater delta temperatures for a given air compression level, so that high thermal effectiveness is provided.

The centrifugal type of air temperature splitters can be more effective than vortex tubes, since a blower is inherent at each stage to increase the pressure and thereby the final temperatures.

The nonmoving parts of the vortex tubes, in a series arrangement would be less expensive and more compact than the powered rotating components of the air temperature splitters, but would not achieve as high a delta temperature as the latter system.

Electric resistance heaters would be used for preheating and interstage heating, while thermoelectric cooler units would be employed for precooling and interstage cooling.

The choice of airflow temperature arrangements should be based on the specific application, and be governed by the horsepower output, package size, initial cost an fuel economy rate (operating cost) for the total power system.

It is possible that an efficient, high-compression air temperature splitter system may provide a high enough hot side temperature to operate the C.C.E. for some lower power output applications. Some experimentation will be necessary to reach the point of best utilization of the hot airflow over the engine hot side, for all engine applications.

It is believed that although the air temperature splitter or vortex tube arrangements may appear complex because of the pre- and interstage thermal units and cross connections, the total system can be made compact and relatively inexpensive by the application of metal castings and high-impact plastic components.

It should be noted that the compound thermal system should provide greater closed cycle engine (C.C.E.) operating economy, since the secondary air temperature splitter means does not directly require fuel and functions to boost the effectiveness of the primary or basic thermal means.

The engine and compound thermal system are located in the vehicle so that a normal rearway engine drive shaft is allowed, while the ram air forced in when the car is in motion is finally brought out along the side of the vehicle, after passing through the a/t splitters or v/'s and the liquid coolant radiator.

The final hot and cold airflows may selectively be brought into the body of the vehicle to air condition the car, should the volume of airflow from the crossover tube arrangements prove ineffective in performing this function.

If the final hot and cold airflows are brought into the car body for air conditioning, side air pressure relief vents would be provided to allow a continuous airflow through the vehicle.

This arrangement has the advantage of providing an air-conditioning system for the vehicle as part of the complete engine package, without additional components and power drain.

The air-conditioning arrangement would be superior to existing units, since nearly instantaneous heating and cooling would be available, with no delay encountered from the engine heating of a liquid coolant.

The ram air arrangement provides an effective initial air inlet flow to the a/t splitters or vortex tubes. The air inlet velocity is proportional to vehicle speed and thereby provides a natural increase and decrease in the a/t splitter or v/t temperature range proportional to vehicle speed.

It is believed that mass, effective air pollution control will only be realized by the superior total economics of the newer power systems currently best represented by turboelectric hybrids and C.C.E. hybrids, rather than achieved by the verbal airing of the urgency of a solution based on the morality of the issue. An economical engineering solution to the engine air pollution is a relatively simple task compared to overcoming the formidable barriers of vested interests, — public indifference and inertia.

It is an object of the invention to product a reliable heating and cooling system for closed cycle engines which operates at near-zero level of toxic exhaust emissions.

It is an object of the invention to provide a compound thermal system which operates on a minimum of fuel for improved operating economy.

It is a final object of the invention to provide a compound thermal system which is basically simple and inexpensive to manufacture and requires a minimum of maintenance.

The above objects and aims will be apparent from the detailed description to follow when taken in conjunction with the drawings. It should be understood that variations may be made in the detail design of the compound thermal system without departing from the spirit and scope of the invention.

Referring to the drawings.

Figure 1:
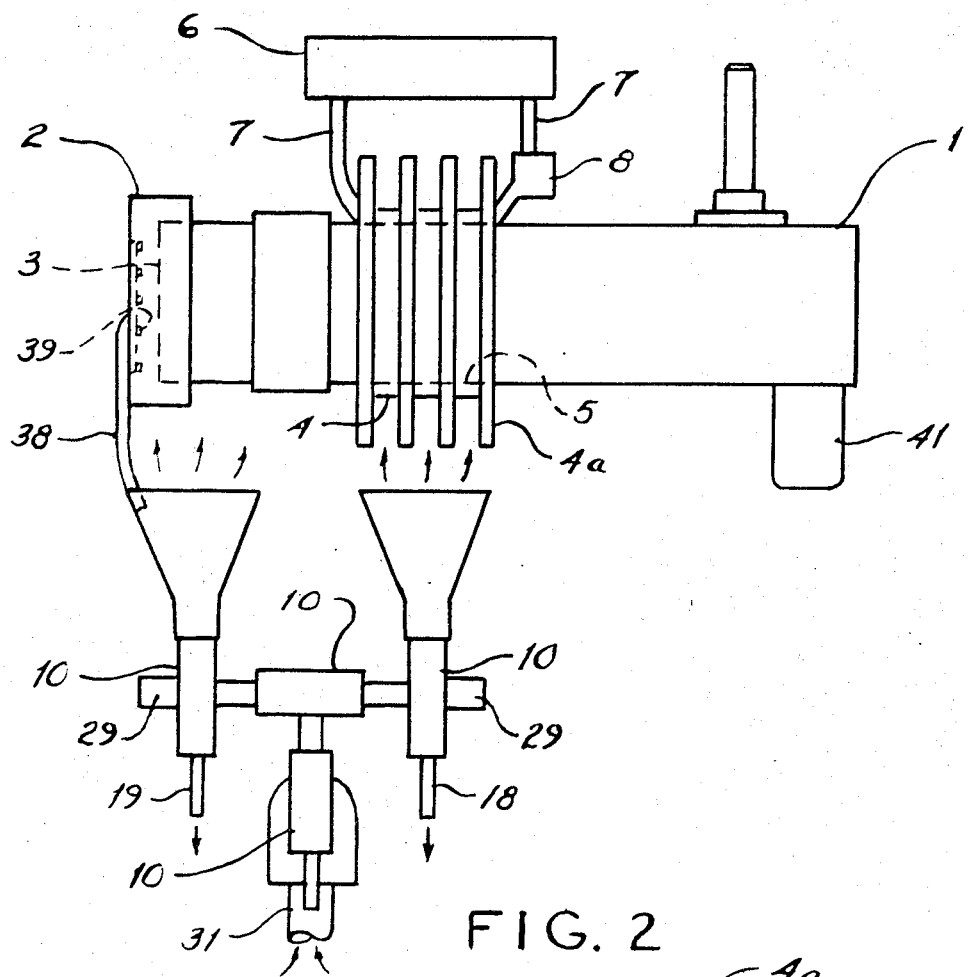
FIG. 1 is a top view of the closed cycle engine fitted with the compound thermal system.
Figure 2:
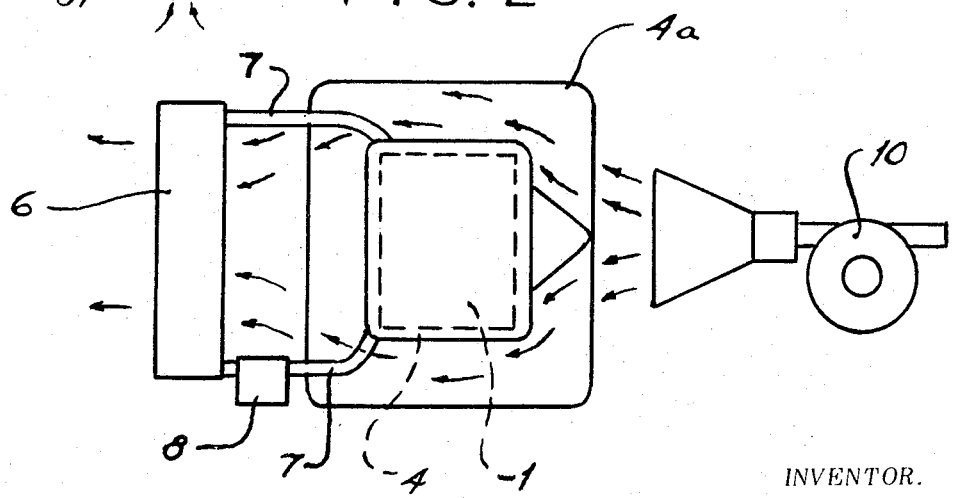
FIG. 2 is a right side view of the closed cycle engine fitted with the compound thermal system.
Figure 3:
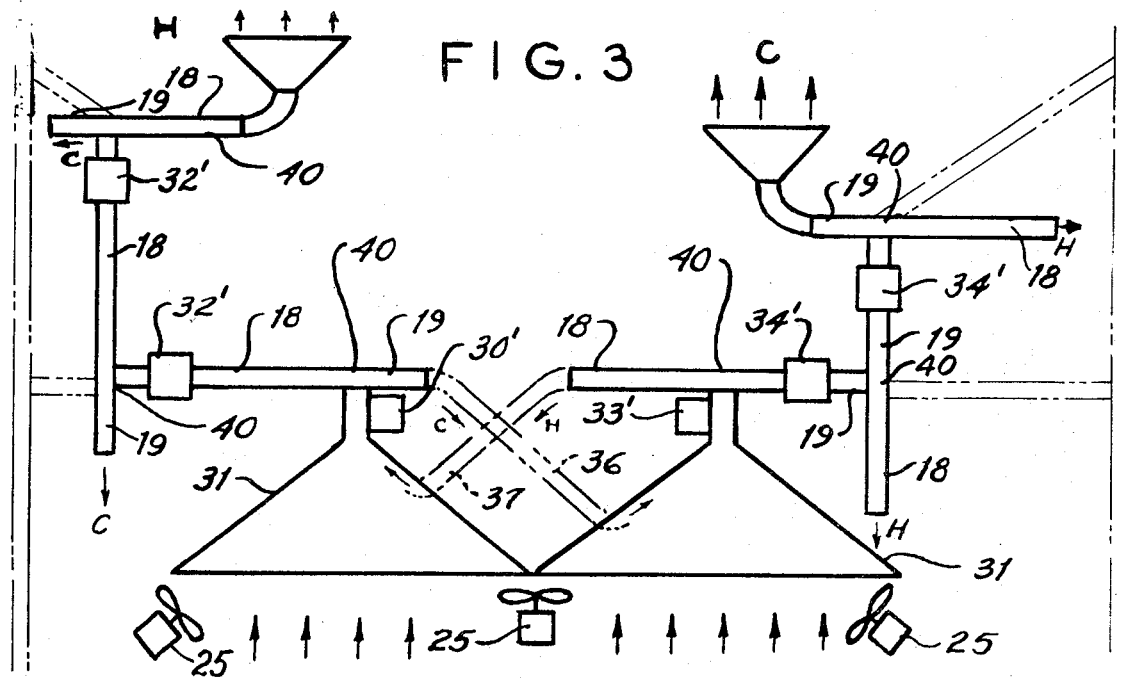
FIG. 3 is a view of a series of vortex tube stages.
Figure 4:
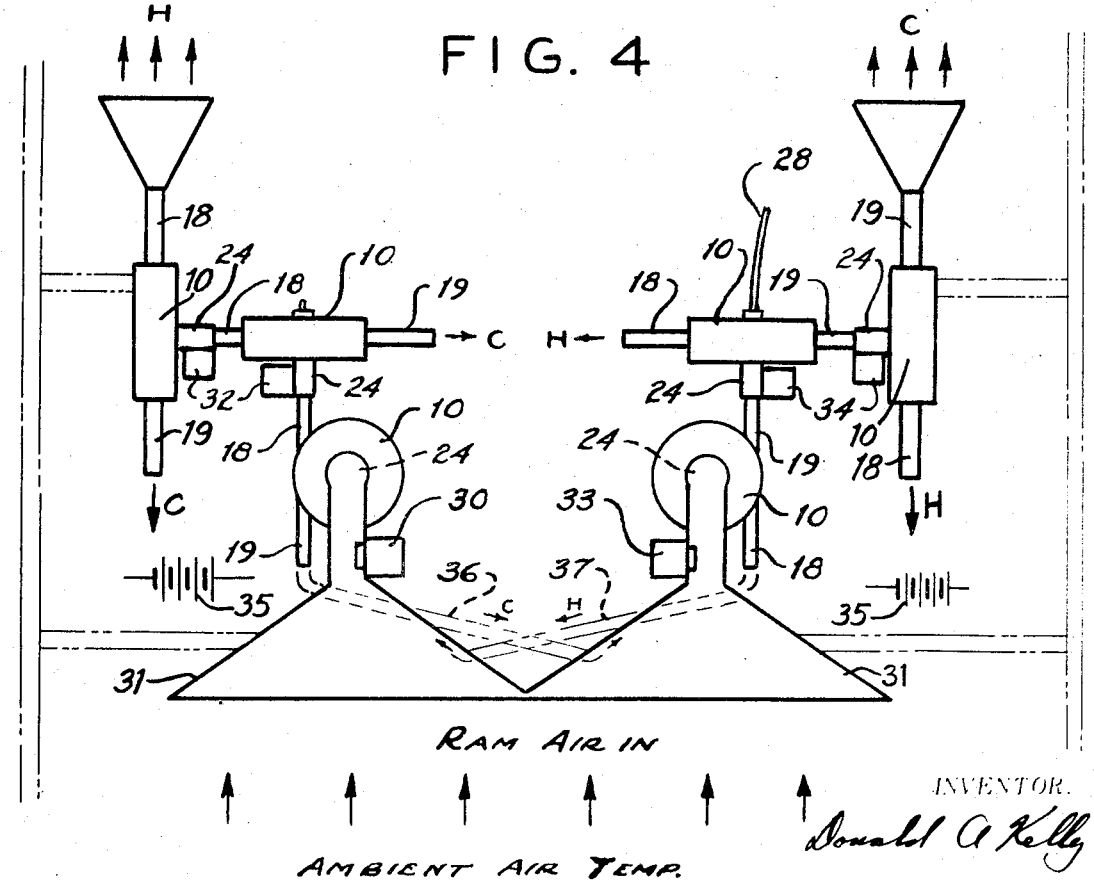
FIG. 4 is a view of a series of air temperature splitter stages (3 stages shown).
Figure 5:
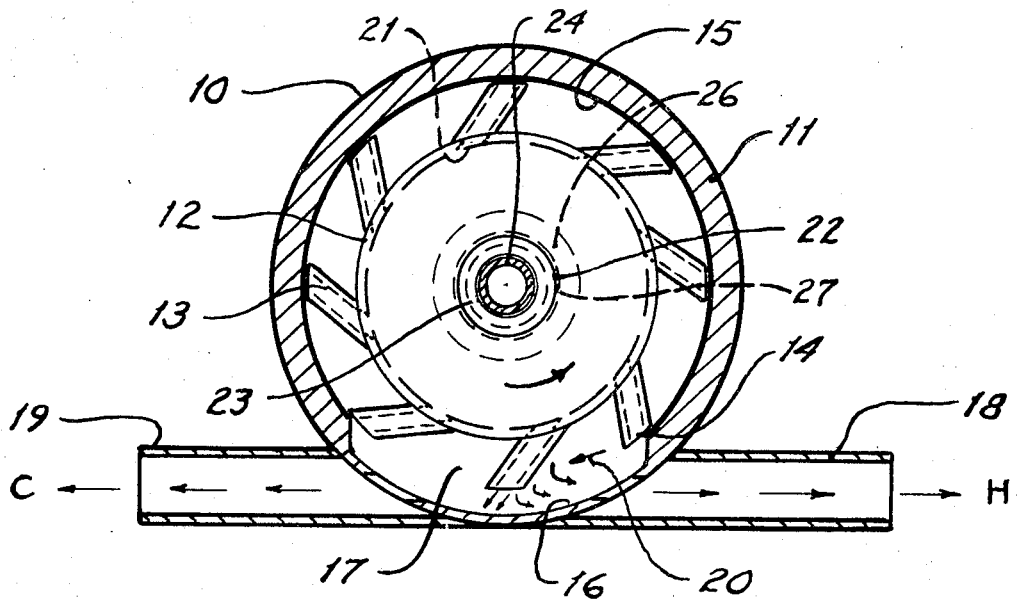
FIG. 5 is an elevation view of a powered air temperature splitter unit.
Figure 6:
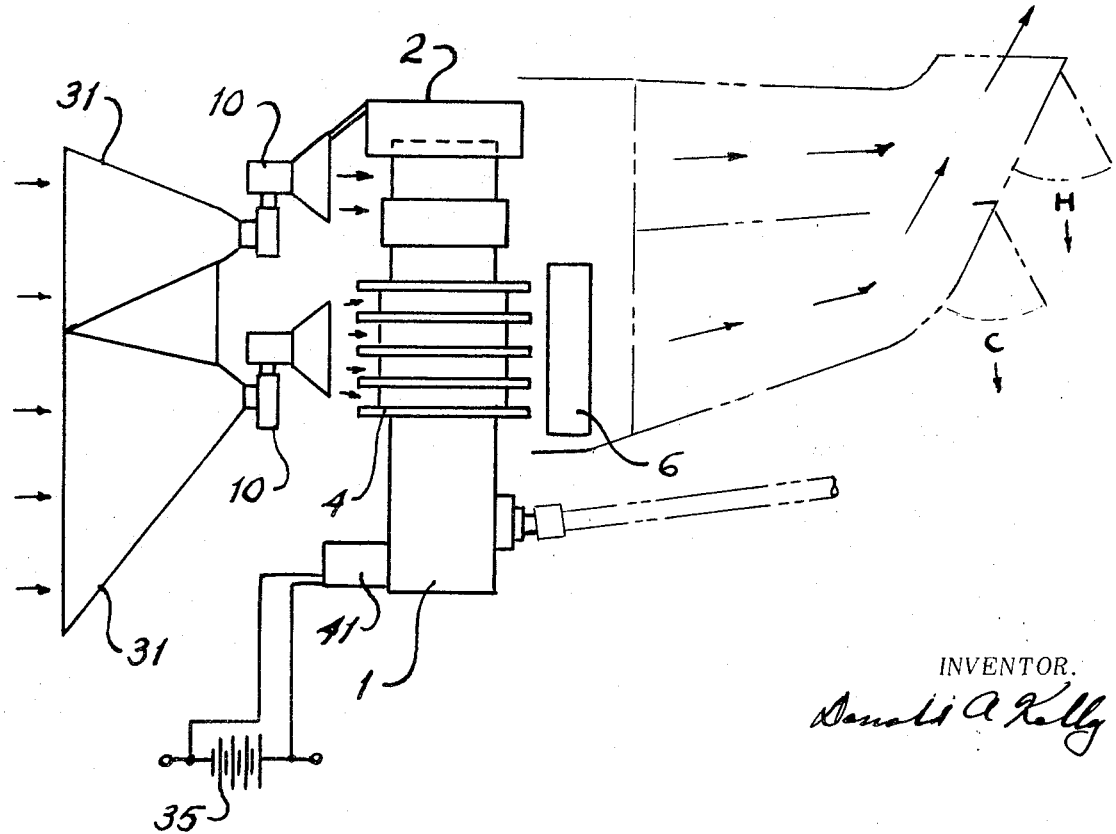
FIG. 6 is a schematic of the complete compound thermal system.

Referring to the drawings in detail:

The compound thermal system for closed cycle engines 1, consists of a conventional gas or fuel oil burner 2, in close contact with the hot side 3, of the closed cycle engine 1.

A specially formed liquid coolant jacket 4, is secured to a maximum surface area of the engine cold side 5, of the closed cycle engine 1. The jacket is formed with liquid coolant carrying fins 4a, which provide a maximum heat transfer surface area.

A liquid coolant circulation arrangement consists of a radiator 6, with connecting liquid lines 7, and a high-speed liquid pump 8, connected in a closed loop from the liquid coolant jacket 4.

The above components comprise the conventional primary portion of the compound thermal system.

The second or supporting thermal means consists of a series of air temperature splitters 10, which are connected so that the combined stages are compactly arranged with the final airflows directed over the liquid coolant jacket 4, fins 4a, and the gas or fuel oil burner 2.

The air temperature splitter units 10, are comprised of a cylindrical housing 11, in which a centrifugal air shell 12, rotates, The air shell 12, is provided with hollow vanelike air impellers 13, equally spaced on the periphery of the air shell 12, and canted at an acute angle to the periphery of the air shell 12. The air exit ports 14, of the air impellers 13, are concentric with the center of the rotating air shell 12, center.

A portion of the inside circumference 15, of the cylindrical housing 11, has a diameter which is only slightly larger (0.005 to 0.010 of an inch) than the diameter of the circle described by the air exit ports 14, so that airflow over this portion of the I.D. of the cylindrical housing 11, is snubbed or impeded.

The balance of the inside of the cylindrical housing 11, has a larger radius than the radius of the air exit ports 14, so that an air-splitting chamber 17, is formed.

A tangential hot duct 18, and 180° opposite cold duct 19, are integrally formed with the cylindrical housing 11; with both ducts in line with the air splitting chamber 17.

The air shell 12, must rotate in a direction such that an obtuse angle is formed between the canted air impellers 13, and the tangential excited air stream 20.

The air shell 12, is a closed cylindrical chamber, except for the multiple exit ports 21, and the intake tube 22, which has an air baffle flange 23, at its exterior end. An air pressure supply tube 24, from the air compressor or blower 25, forces air into the air shell 12. The air supply tube 24, outside diameter is a close clearance fit with the inside diameter of the air baffle flange 23.

Two ball bearings 26, support and allow the air shell 12, to freely rotate, with one closely fitted to the supply tube 24, and the other closely fitted to the opposite shaft extension 27.

The air shall 12, may be propelled by the flexible drive shaft extension 28, from the C. C. Engine 1, or optionally by the electric motors 29.

The unit air temperature splitters 10, are joined together in two groups, hot and cold, in the required number of stages for the given application. One group is biased hot and has an electric resistance preheater unit 30, at the entrance of the a/t splitter 10, and the air supply tube 24. The incoming air that flows over the preheater unit 30, is received from the ram air tube 31, with air pressure support from the powered blower 25. The hot duct 18, of the a/t splitter 10, is connected to the electric resistance interstage heater unit 32, which is connected to the air supply tube 24 of the second a/t splitter 10, which forms the second stage. A third and fourth stage may be connected in a similar manner as the first and second stages with the interstage heater unit 32, placed between the stages.

The other group of cold air temperature splitters 10, are jointed together in a similar manner as the hot a/t splitters 10. Thermoelectric precooler units 33, and thermoelectric interstage cooler units 34, are utilized to form a biased cold series of a/t splitter stages.

The incoming airflow over the precooler unit 33, is received from the ram air tube 31, with air pressure support from the blower 25.

Additional blowers 25, may be interposed between the hot and cold airflow stages, if required to increase the airflow rate and pressure within the a/t splitter system.

The number of cold a/t splitter 10 stages matches the number of hot a/t splitter 10 stages so that the delta temperature range is balanced.

The electric resistance preheaters 30, and interstage heaters 32, receive their electric power from the battery array 35. The thermoelectric precoolers 33, and interstage coolers 34, receive their electric power from the battery array 35.

Hot and cold crossover tubes 36 and 37, respectively, provide a means of scavenging the ejected air temperature flow from the opposite thermal stages. The crossover tubes 36 and 37, may be connected at any stage and fed into the opposite thermal first stage, adjacent to the preheater unit 30, and the precooler unit 33.

The use of the hot and cold crossover tubes 36 and 37, is optional for pretemperature use, and is applicable only when the scavenged temperature is higher or lower than the than the airflow temperature introduced at the entrance of the first stage a/t splitters 10.

The hot and cold crossover tubes 36 and 37, should be used to air-condition the vehicle and may be selectively controlled to provide either hot or cold airflow into the car body. This air-conditioning method has the advantage of providing instantaneous heating and cooling as part of the total power package as standard, not optional equipment.

The final hot airflow from the last stage of the a/t splitter 10, is directed over the hot side 3, of the closed cycle engine 1, and partly into the gas or fuel oil burner 2, by the duct 38, where it is used to increase the combustion efficiency of the multiple burner jets 39.

The final cold airflow from the last stage of the a/t splitter 10, is directed over the liquid coolant jacket 4 and fins, 4a, and then through the radiator 6, which is in line with the fins 4a.

The alternate second thermal means consists of a series of conventional vortex tubes (vr's) 40, which are joined together in a similar manner to that of the air temperature (a/t) splitters 10.

The same preheater units 30', and precooler units 33', interstage heater units 32', interstage cooler units 34', would be used with the biased hot and cold vortex tubes 40, stages.

Additional blowers 25, may be interposed between the vortex tube 40, stages, if required to increase the airflow rate and pressure within the V.T. system.

An alternator 41, is provided for the system to charge the battery array 35, in driving, and is engine driven as an accessory, as in usual I.C. engine practice.

What is claimed is:

1. A compound thermal system comprised of two complementary thermal arrangements,
    a primary fuel burner unit in close association with the hot side of a closed cycle engine, a primary liquid coolant jacket in close association with the cold side of said closed cycle engine, large liquid coolant conducting hollow fins uniformly disposed on said liquid coolant jacket,
    a liquid coolant circulating arrangement comprised of liquid conducting tubes in a closed loop connecting said liquid coolant jacket with a heat exchanging radiator, high-speed pumping means disposed within said liquid-carrying tubes of said closed loop,
    a secondary thermal means comprising biased hot and cold multiple air temperature splitters connected in series to form thermal stages,
    a cylindrical housing containing a concentric revolving air shell,
    multiple vanelike hollow air impellers uniformly disposed on the periphery of said concentric revolving air shell,
    communicating port means uniformly disposed between said multiple vanelike hollow air impellers and said concentric revolving air shell,
    an air pressure intake tube axially disposed on one end of said concentric revolving air shell, a snubbing flange means disposed at the outer end of said air pressure intake tube,
    an obtuse angular portion of the inside diameter of said cylindrical housing at close clearance with the revolving ends of said multiple vanelike hollow air impellers,
    an acute angular portion of the inside diameter of said of said cylindrical housing of enlarged radius forming an air splitter chamber,
    hot and cold tangential airflow ducts integrally formed with said cylindrical housing and disposed at a straight angle to each other,
    shaft means axially disposed on said air shell at the opposite end of said air shell from said air pressure intake tube,
    bearing means disposed on said shaft means and said air pressure intake tube secured to said cylindrical housing,
    a stationary air supply tube concentrically disposed to said air pressure intake tube,
    blower means in close communication with said air supply tube.

2. A compound thermal system according to claim 1, including
    electric preheating means disposed near the base of said stationary air supply tube associated with said biased hot multiple air temperature splitters,
    thermoelectric precooling means disposed near the base of said stationary air supply tube associated with said biased cold multiple air temperature splitters,
    electric interstage heating means disposed between the stages of said biased hot multiple air temperature splitters,
    thermoelectric interstage cooling means disposed between the stages of said biased cold multiple air temperature splitters.

3. A compound thermal system according to claim 1, including
    thermal crossover tubes disposed between the ejected air temperature flow from one thermal flow stage and the first stage of the opposite thermal stages,
    connection means from said thermal crossover tubes and the interior of the vehicle powered by the said closed cycle engine,
    selective control means for the connection means from said thermal crossover tubes.

4. A compound thermal system according to claim 1, including:
    additional air blower means disposed between the said biased hot and cold multiple air temperature splitters as required,
    ram air means disposed at the front of the said vehicle powered by the said closed cycle engine connected to the said stationary air supply tube associated with said biased hot and cold multiple air temperature splitters.

5. A compound thermal system according to claim 1, wherein the final hot airflow from the last stage of said biased hot multiple air temperature splitters is directed over said hot side of said closed cycle engine,
    part of the final hot airflow is directed into the said fuel burner unit in close association with the hot side of said closed cycle engine,
    the final cold airflow from the last stage of said biased cold multiple air temperature splitters is directed over said cold side of said closed cycle engine.

6. A compound thermal system comprising two complimentary thermal arrangements,
    a primary fuel burner unit in close association with the hot side of a closed cycle engine,
    a primary liquid coolant jacket in close association with the cold side of said closed cycle engine,
    large liquid-coolant-conducting hollow fins uniformly disposed on said liquid coolant jacket,
    a liquid-coolant-circulating arrangement comprised of liquid conducting tubes in a closed loop connecting said liquid coolant jacket with a heat-exchanging radiator,
    high-speed pumping means disposed within said liquid conducting tubes of said closed loop,
    a secondary thermal means comprising biased hot and cold vortex tubes connected in series to form thermal stages,
    gas or fuel oil burner preheating means disposed near the air intake side of said biased hot vortex tubes, gas or fuel oil burner interstage heating means disposed between the stages of said biased hot vortex tubes, thermoelectric precooler means disposed near the air intake side of said biased cold vortex tubes, thermoelectric interstage cooling means disposed between the stages of said biased cold vortex tubes, air blower means disposed near the air intake side of said biased hot and cold vortex tubes, air blower means disposed between the stages of said biased hot and cold vortex tubes.

7. A compound thermal system according to claim 6, including thermal crossover tubes disposed between the ejected air temperature flow from the opposite thermal stages and the interior of the vehicle powered by the said closed cycle engine, selective control means for the ejected hot and cold air flows from said thermal crossover tubes to the interior of the vehicle powered by the said closed cycle engine.

8. A compound thermal system according to claim 6, including ram air means at the front of the vehicle powered by said cycle engine connected near the air intake side of said biased hot and cold vortex tubes, air blower means disposed within said ram air means, an electric motor drive for said air blower means, control, means for said air blower means.

9. A compound thermal system according to claim 6, wherein the final hot airflow from the last hot stage of said biased hot vortex tube is directed over said hot side of said closed cycle engine, part of the final hot airflow is directed into the said fuel burner unit in close association with the hot side of said closed cycle engine, the final cold airflow from the last cold stage of said biased cold vortex tubes is directed over cold side of said closed cycle engine, and said heat-exchanging radiator.

10. A compound thermal system according to claim 6, wherein the final hot and cold airflows are lastly directed into the interior of the vehicle powered by the said closed cycle engine, selective control means for the said final hot and cold airflows directed into the interior of the vehicle powered by the said closed cycle engine.

* * * * *